(12) United States Patent
Shin

(10) Patent No.: US 10,373,289 B2
(45) Date of Patent: Aug. 6, 2019

(54) LONG-RANGE DISCERNIBLE IMAGE GENERATING APPARATUS AND METHOD OF OPERATING SAME

(71) Applicant: Dong-Yun Shin, Yongin-si (KR)

(72) Inventor: Dong-Yun Shin, Yongin-si (KR)

( * ) Notice: Subject to any disclaimer, the term of this patent is extended or adjusted under 35 U.S.C. 154(b) by 90 days.

(21) Appl. No.: 15/508,437

(22) PCT Filed: Sep. 2, 2015

(86) PCT No.: PCT/KR2015/009230
§ 371 (c)(1),
(2) Date: Mar. 2, 2017

(87) PCT Pub. No.: WO2016/036126
PCT Pub. Date: Mar. 10, 2016

(65) Prior Publication Data
US 2017/0289521 A1    Oct. 5, 2017

(30) Foreign Application Priority Data
Sep. 3, 2014   (KR) ........................ 10-2014-0117253

(51) Int. Cl.
*G06T 3/00*    (2006.01)
*G06T 3/60*    (2006.01)
(Continued)

(52) U.S. Cl.
CPC .............. *G06T 3/0093* (2013.01); *G06T 3/60* (2013.01); *G06T 3/00* (2013.01); *G06T 5/00* (2013.01); *H04N 13/261* (2018.05)

(58) Field of Classification Search
None
See application file for complete search history.

(56) References Cited

U.S. PATENT DOCUMENTS

| 2009/0251491 A1* | 10/2009 | Merifield | G06T 3/005 345/647 |
| 2012/0328196 A1* | 12/2012 | Kasahara | G06T 15/20 382/190 |
| 2014/0108466 A1* | 4/2014 | Wagner | G06K 9/4671 707/803 |

FOREIGN PATENT DOCUMENTS

| KR | 101060152 B1 | 8/2011 |
| KR | 20130035959 A | 4/2013 |

(Continued)

OTHER PUBLICATIONS

International Search Report dated Jan. 14, 2016 for PCT Application No. PCT/KR2015/009230.

*Primary Examiner* — Justin P. Misleh
(74) *Attorney, Agent, or Firm* — Moser Taboada

(57) ABSTRACT

The present invention relates to a long-range discernible image generating apparatus and a method of operating the same, and particularly, to a long-range discernible image generating apparatus and a method of operating the same, which are capable of providing improved legibility. According to an embodiment of the present invention, a long-range discernible image generating apparatus is provided. The long-range discernible image generating apparatus includes an image providing unit for providing a first image including at least one character; an image converting unit for generating a second image which has the proportions of the first image altered by reflecting predetermined point of view information—the point of view information including information on at least one of a direction of view and an angle of view for the first image; and a reference point extracting unit for extracting the coordinates for the first reference point and the coordinates for the second reference point corresponding to the first reference point and the image converting unit compares the coordinates for the first reference point to the (Continued)

(a)

(b)

coordinates for the second reference point so as to be able to convert the first image.

15 Claims, 7 Drawing Sheets

(51) Int. Cl.
    *G06T 5/00*          (2006.01)
    *H04N 13/261*     (2018.01)

(56) References Cited

FOREIGN PATENT DOCUMENTS

| | | |
|---|---|---|
| KR | 101261409 B1 | 5/2013 |
| KR | 20130051681 A | 5/2013 |
| KR | 101351911 B1 | 1/2014 |

\* cited by examiner (a)                (b)

LONG-RANGE DISCERNIBLE IMAGE GENERATING APPARATUS AND METHOD OF OPERATING SAME

TECHNICAL FIELD

The present invention relates to a long-range discernible image generating apparatus and a method of operating the same, and particularly, to a long-range discernible image generating apparatus and a method of operating the same, which are capable of providing improved legibility.

BACKGROUND

FIG. 1 illustrates a use example of a road surface sign in the related art.

As illustrated in FIG. 1, the road surface sign is disposed on a road to provide various information to a driver through a speed limit, a progress direction and a direction display, a children protection zone display, and the like at a location required for driving and traffic safety on the road. However, when a driver of a vehicle actually views the road surface sign on the road in the vehicle, there is a problem in that legibility of the road surface sign deteriorates due to a distortion phenomenon such as a angle of view of the driver or a distance from the road surface sign.

In order to solve the problem, a method for enhancing the legibility is attempted by generally adjusting a ratio of a width and a length of the road surface sign in a form in which the width or length is long. However, according to the method in the related art, there are a lot of cases that detailed matters or degrees of adjustment of the road surface sign are determined by a subjective judgment criterion of a constructer and construction convenience, and as a result, an enhancement effect of the legibility is slight, it is difficult to provide a consistent enhancement effect, and there is also a problem in that the surface road sign may mismatch a surrounding environment.

Therefore, required are a long-range discernible image generating apparatus and a method of operating the same, which can provide a consistent and easy image converting method and provide the enhanced legibility with a match with the surrounding environment in configuring various signs displayed on a target surface and providing predetermined information, which include the road surface sign, and the like.

SUMMARY

Technical Problem

The present invention is contrived to solve the problem and the present invention has been made in an effort to provide a long-range discernible image generating apparatus and a method of operating the same, which can provide a consistent and easy image converting method and provide the enhanced legibility in harmony with the surrounding environment.

Technical Solution

According to an embodiment of the present invention, a method of operating a long-range discernible image generating apparatus is provided. The method may include: providing a first image including at least one character; generating a second image which has the proportions of the first image altered by reflecting predetermined point of view information for the first image—the point of view information including information on at least one of a direction of view and an angle of view for the first image; extracting the coordinates for the first reference point of the first image and the coordinates for the second reference point of the second image corresponding to the first reference point; and converting the first image by comparing the coordinates of the first reference point and the coordinates of the second reference point.

According to an embodiment of the present invention, a computer readable storage medium having a program recorded thereon configured to perform the method of operating the long-range discernible image generating apparatus is provided.

According to an embodiment of the present invention, a long-range discernible image generating apparatus is provided. The long-range discernible image generating apparatus includes: an image providing unit providing a first image including at least one character; an image converting unit generating a second image which has the proportions of the first image altered by reflecting predetermined point of view information—the point of view information including information on at least one of a direction of view and an angle of view for the first image; and a reference point extracting unit extracting the coordinates for the first reference point and the coordinates for the second reference point corresponding to the first reference point and the image converting unit converts the first image by comparing the coordinates of the first reference point and the coordinates of the second reference point.

Advantageous Effects

According to the present invention, a long-range discernible image is implemented by transforming an original image through an inverse perspective to reduce a phenomenon in which long-range images appear crumpled by a perspective at the time of displaying the long-range discernible image on target surfaces including a road surface, a building wall, and the like and the horizontal thicknesses of a close side and a distant side of the image in a legible distance area appear similar to each other to further increase legibility.

According to the present invention, since a relative ratio of a vertical direction and a horizontal direction is transformed only in one direction of the vertical direction and the horizontal direction of an original image according to a set direction of view, excessive transformation of the image is prevented to maintain an identity of an applied letter style and provide a long-range discernible image which can match a surrounding environment.

BRIEF DESCRIPTION OF THE DRAWINGS

A brief description of each drawing is provided to more sufficiently understand drawings used in the detailed description of the present invention.

DETAILED DESCRIPTION

Figure 1:
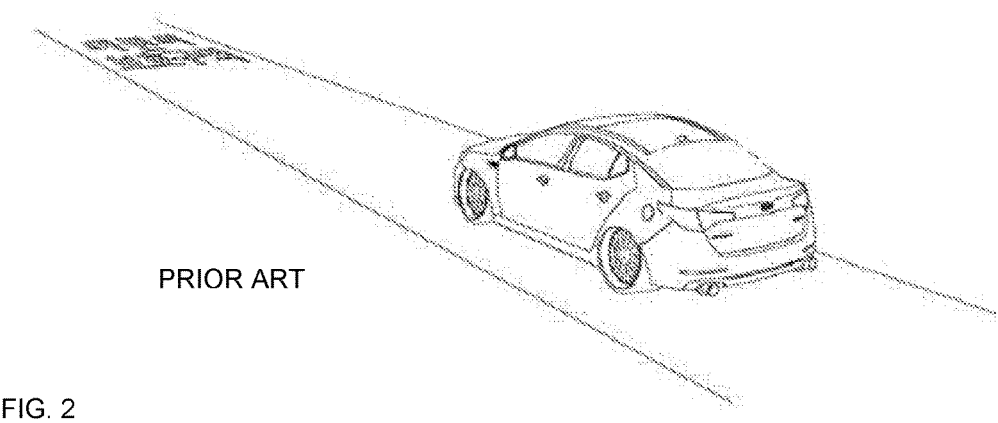
FIG. 1 illustrates a use example of a road surface sign in the related art.

Hereinafter, embodiments of the present invention will be described with reference to the accompanying drawings. When reference numerals refer to components of each drawing, it is noted that although the same components are illustrated in different drawings, the same components are designated by the same reference numerals as possible. In describing the exemplary embodiments of the present invention, when it is determined that the detailed description of the known components and functions related to the present invention may obscure understanding of the exemplary embodiments of the present invention, the detailed description thereof will be omitted. Further, hereinafter, the embodiments of the present invention will be described, but the technical spirit of the present invention is not limited thereto or restricted thereby and the embodiments can be transformed and variously executed by those skilled in the art.

Throughout this specification and the claims that follow, when it is described that a part is "coupled" to another part, the part may be "directly coupled" to the other part or "indirectly coupled" to the other part through a third part. Throughout the specification, unless explicitly described to the contrary, the word "comprise" and variations such as "comprises" or "comprising", will be understood to imply the inclusion of stated elements but not the exclusion of any other elements.

Figure 2:
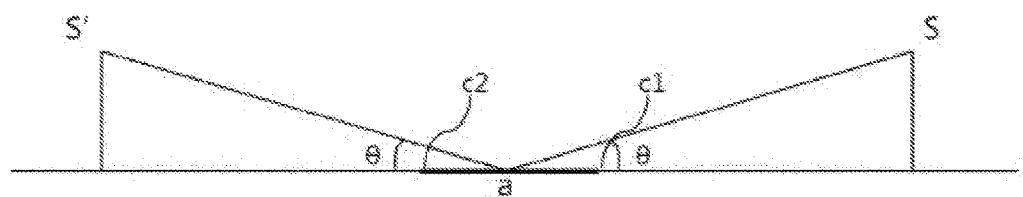
FIG. 2 is a conceptual view illustrating a principle of a long-range discernible image generating apparatus according to an embodiment of the present invention.

FIG. 2 is a conceptual view illustrating a principle of a long-range discernible image generating apparatus according to an embodiment of the present invention.

Figure 3:
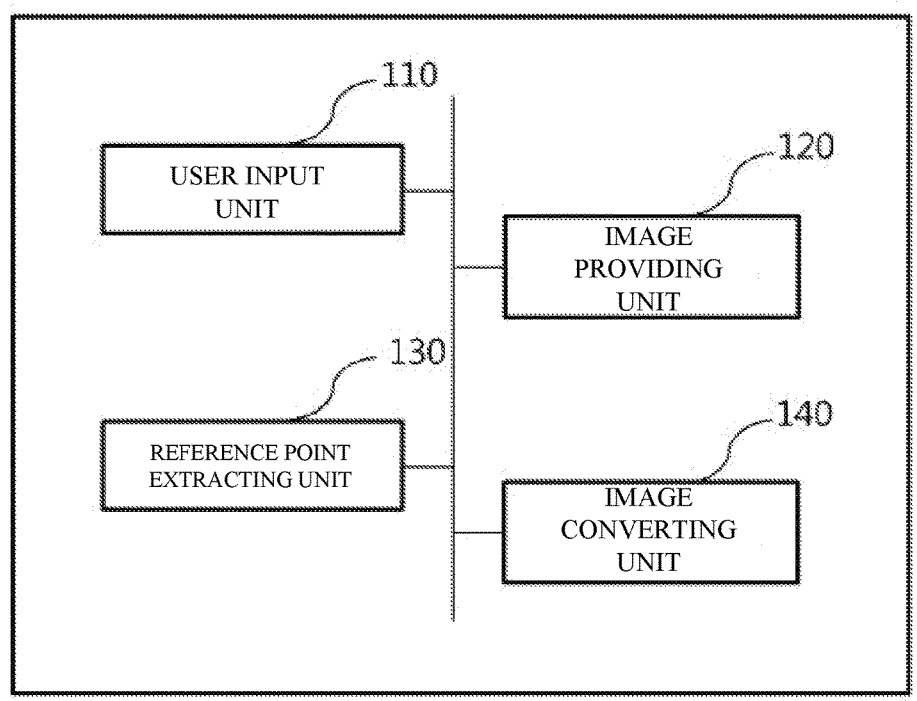
FIG. 3 illustrates a long-range discernible image generating apparatus according to an embodiment of the present invention.

The long-range discernible image generating apparatus 100 of FIG. 3 according to the embodiment of the present invention converts an original image by applying an inverse perspective to generate a long-range discernible image of which legibility is improved in a predetermined direction of view and at a predetermined angle of view. Herein, the inverse perspective is acquired by inversely applying a perspective and in detail, the inverse perspective may be defined as a method in which an area of a view target, which is distant from a location of a viewer is expressed to be magnified and an area of the view target, which is close to the location of the viewer is expressed to be reduced to reduce a phenomenon in which a target is distorted according to the perspective when the target is viewed at a specific point of view.

When the inverse perspective is described in detail with reference to FIG. 2, assumed that the viewer such as a driver of a vehicle or a pedestrian views an image a displayed on a target surface such as a road surface, or the like at a predetermined angle of view θ at a predetermined first point of view S, the image is distorted as if the size of the image is reduced from the bottom c1 to the top c2 of the image a by the perspective to be projected to a view of the viewer. In order to correct the distortion, the image a is required to be displayed while being transformed to a form in which the size of the image a is extended from the bottom c1 to the top c2 by considering the angle of view θ of the viewer. As described above, the inverse perspective may be applied in order to acquire the transformed image.

That is, assumed that when a virtual second point of view S' is set at an opposite location to be symmetric to the first point of view S based on the image a and the viewer views the image a at the same angle of view θ at the second point of view S', the image a will be projected to the view of the viewer as if the size of the image a is reduced from the top c2 to the bottom c1 of the image a, that is, the size of the image a is extended from the bottom c1 to the top c2 opposite to the first point of view S. Since the image projected to the viewer at the reverse virtual second point of view S' is transformed to a form in which the size of the original image a is extended from the bottom c1 to the top c2 according to the same angle of view θ as the first point of view S, when an actual image to be displayed on the target surface such as the road surface, or the like is configured based on the transformed form, the distortion phenomenon at the first point of view S may be minimized.

As described above, a detailed operation of the long-range discernible image generating apparatus 100 of FIG. 3 according to the embodiment of the present invention, which uses the inverse perspective will be described in detail with reference to FIGS. 4 to 11.

FIG. 3 illustrates a long-range discernible image generating apparatus according to an embodiment of the present invention.

Referring to FIG. 3, the long-range discernible image generating apparatus 100 according to the embodiment of the present invention may include a user input unit 110, an image providing unit 120, a reference point extracting unit 130, and an image converting unit 140.

The user input unit 110 may receive a user input for setting a width w and a height h for defining a display area of a first image, a predetermined character and/or symbol to be included in the first image, letter styles thereof, and the like and transfer the received user input to the image providing unit 120. The image providing unit 120 may provide the first image which is a 2D image including at least one character and/or symbol to the display area according such a user input. Further, the user input unit 110 may receive point of view information and transfer the received point of view information to the image converting unit 140. The image converting unit 140 reflects the received point of view information to convert the first image into a predetermined second image. In this case, the point of view information may include information regarding at least one of the direction of view, the angle of view, and a reference distance. A detailed description of the point of view information will be made with reference to FIGS. 4 to 11. The user input unit 110 may be implemented by various input means known in the art, which is capable of receiving a predetermined user input, such as a touch screen, a mouse, a keyboard, and the like.

The image providing unit 120 may provide the first image including at least one character and/or symbol. That is, when a user inputs through the user input unit 110 set values of the width w and the height h for defining the display area of the first image and setting information regarding the predetermined character and/or symbol to be included in the first image and the letter styles, the image providing unit 120 disposes at least one character and/or symbol displayed with a predetermined letter style in the set display area to generate the first image.

The reference point extracting unit 130 may extract a coordinate of a first reference point (r1-r7 of FIG. 9) of the first image and the coordinate of a second reference point (r1'-r7' of FIG. 9) of the second image corresponding to the first reference point (r1'-r7 of FIG. 9) and transfer the extracted coordinates to the image converting unit 140. That is, when the image converting unit 140 reflects the predetermined point of view information to generate the second image in which a ratio of at least one area of the first image is changed, the reference point extracting unit 130 may extract the coordinates of the first reference point (r1-r7 of FIG. 9) of the first image and the second reference point (r1'-r7' of FIG. 9) of the second image corresponding thereto and transfer an extraction result to the image converting unit 140. The image converting unit 140 compares the coordinates of the first reference point (r1-r7 of FIG. 9) and the second reference point (r1'-r7' of FIG. 9) and changes the size of the reference area in the first image partitioned by the first reference point (r1-r7 of FIG. 9) to generate the long-range discernible image.

The image converting unit 140 reflects the predetermined point of view information to generate the second image in which the ratio of at least one area of the first image is changed. In detail, the image converting unit 140 converts the first image into a 3D image according to a predetermined method, reflects the point of view information, rotates the first image converted into the 3D image at a predetermined angle toward a direction of view around a predetermined rotary axis, and thereafter, extracts a plane image acquired by viewing the first image at an opposite side to the set direction of view to generate the second image to which the inverse perspective is applied. In this case, a rotational angle of the first image may be determined depending on the set angle of view. Further, the image converting unit 140 compares the coordinates of the first reference point (r1-r7 of FIG. 9) and the second reference point (r1'-r7' of FIG. 9) to convert the first image into the long-range discernible image. In detail, the image converting unit 140 compares at least one value of the coordinates of the first reference point (r1-r7 of FIG. 9) and at least one value of the coordinates of the second reference point (r1'-r7' of FIG. 9) corresponding to the first reference point (r1-r7 of FIG. 9) with each other and extends and reduces at least a part of the reference area partitioned by the first reference point (r1-r7 of FIG. 9) to convert the first image into the long-range discernible image.

In FIG. 3, it will be appreciated that the user input unit 110, the image providing unit 120, the reference point extracting unit 130, and the image converting unit 140 may be implemented by a plurality of physical devices and implemented by one physical device. For example, each of the user input unit 110, the image providing unit 120, the reference point extracting unit 130, and the image converting unit 140 may be implemented by using various methods such as using software or firmware.

A more detailed method of operating the long-range discernible image generating apparatus 100 according to the embodiment of the present invention will be described in detail with reference to FIGS. 4 to 12.

Figure 4:
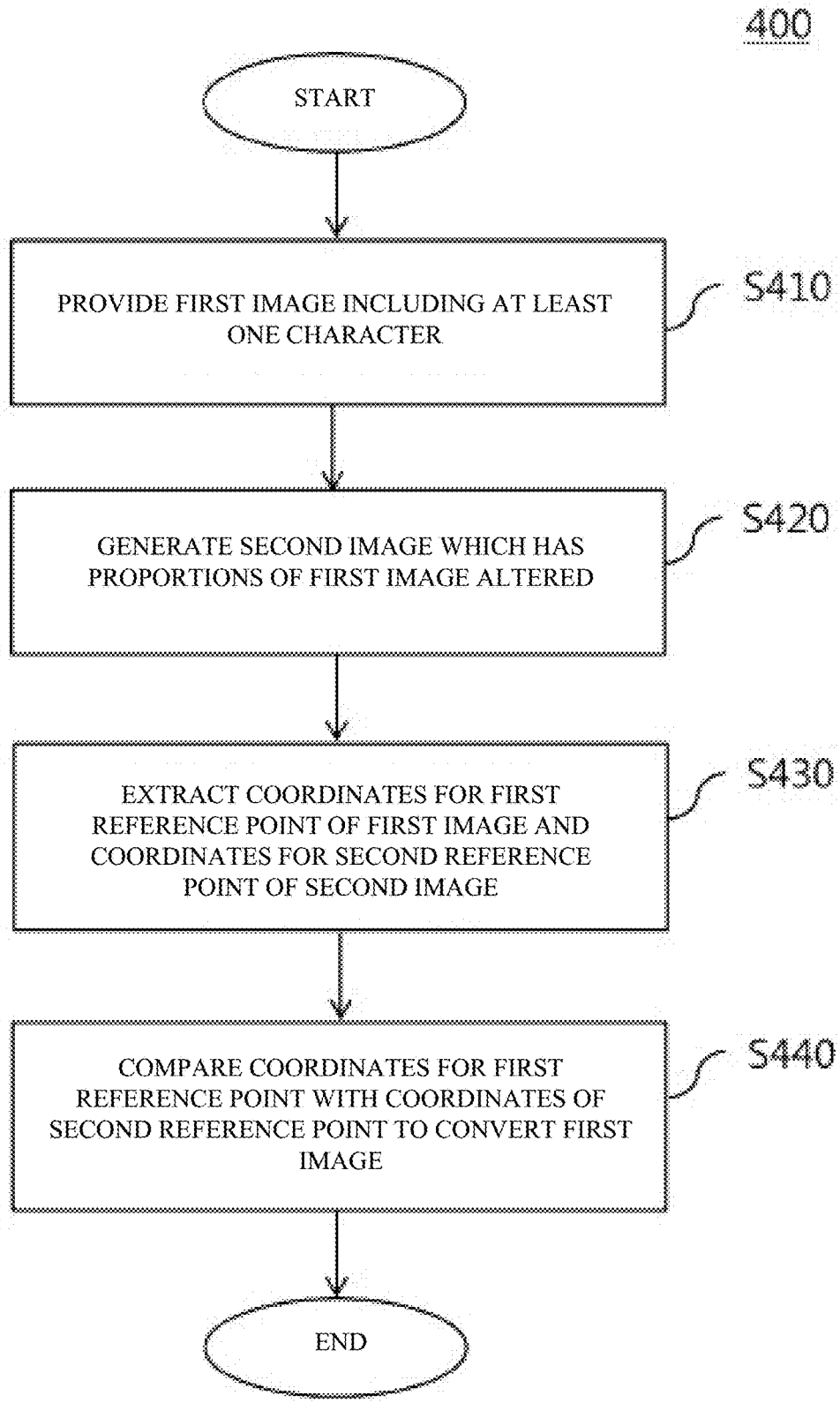
FIGS. 4 and 5 illustrate a method of operating a long-range discernible image generating apparatus according to an embodiment of the present invention.
Figure 5:
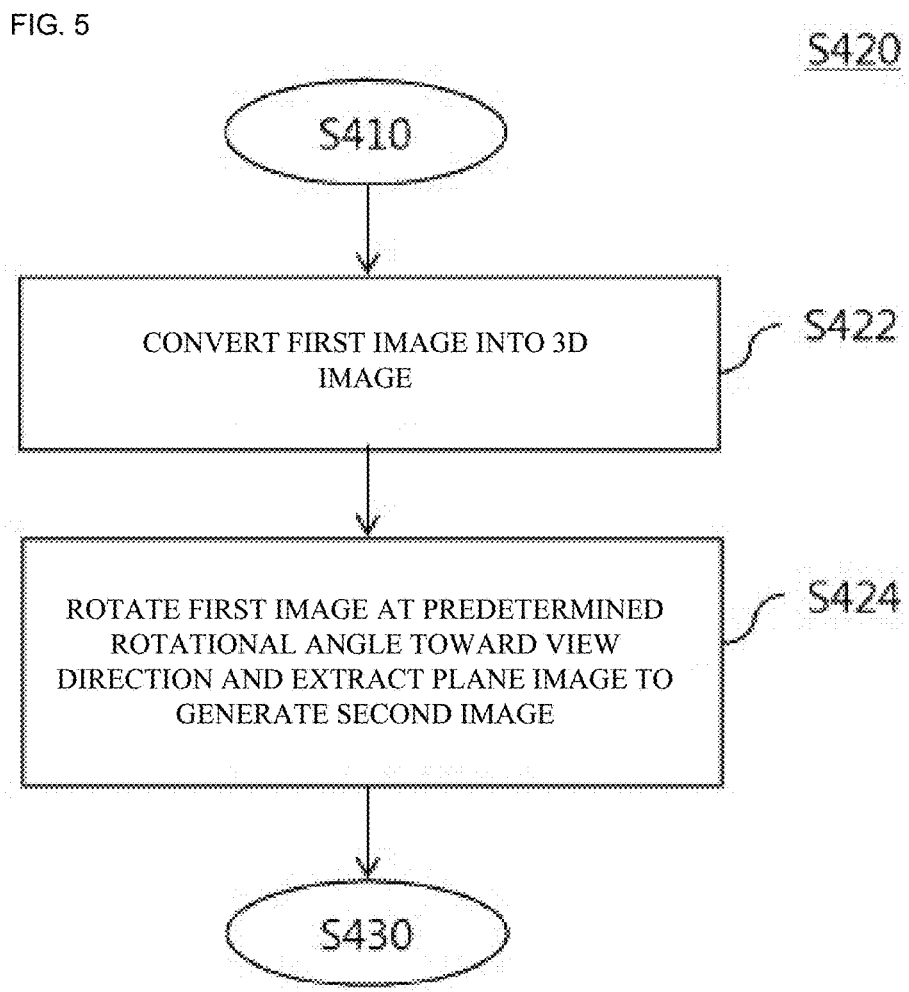

FIGS. 4 and 5 illustrate a method 400 and constitution of step 420 of the method 400, respectively, of operating a long-range discernible image generating apparatus according to an embodiment of the present invention. Further FIGS. 8 to 12 illustrate an exemplary operation of a long-range discernible image generating apparatus according to an embodiment of the present invention.

Figure 6:
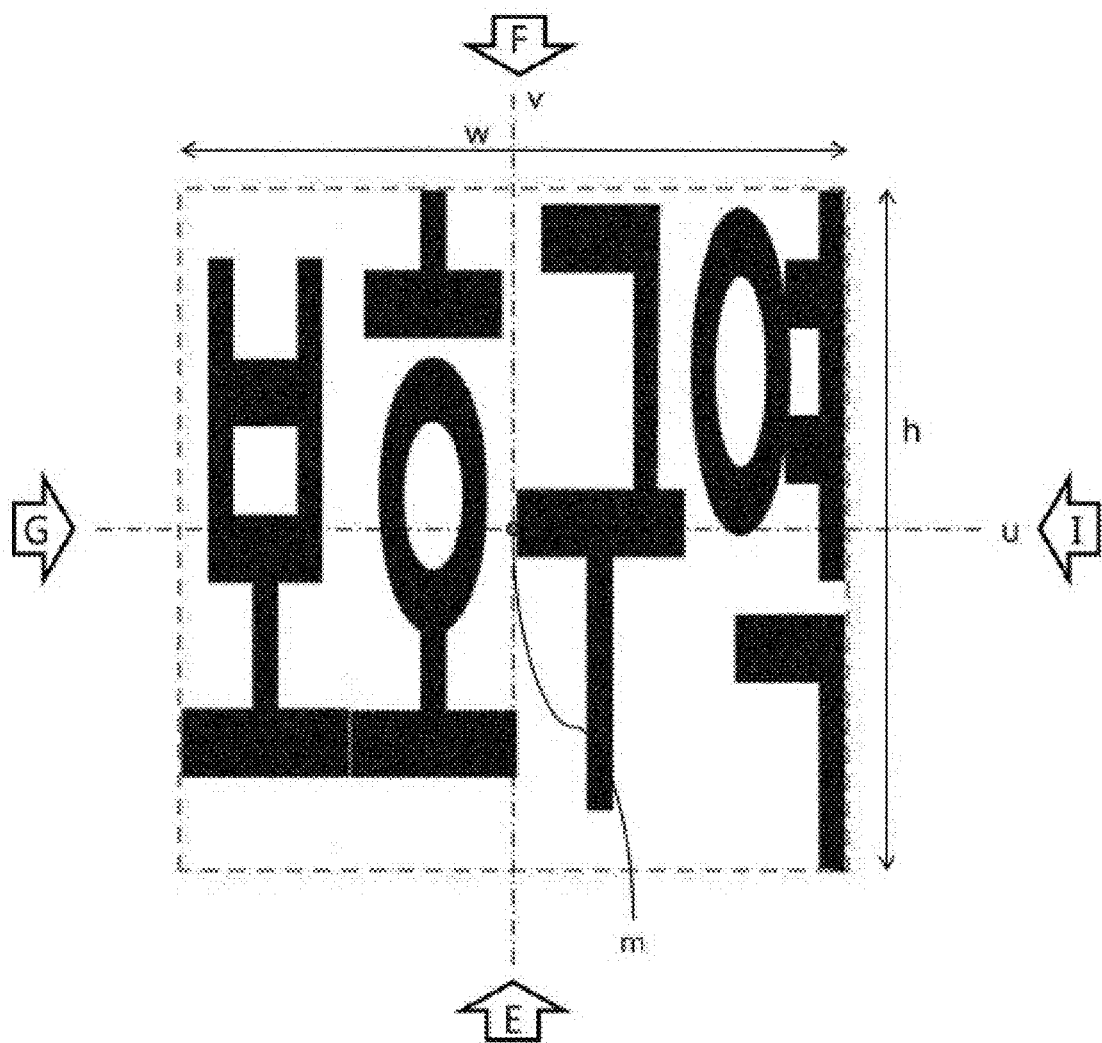
FIGS. 6 to 12 illustrate an exemplary operation of a long-range discernible image generating apparatus according to an embodiment of the present invention.

In step S410, the image providing unit 120 may provide the first image including at least one character and/or symbol. In this case, the first image may be the 2D image generated based on the predetermined user input through the user input unit 110. That is, when a user inputs through the user input unit 110 set values of the width w and the height h for defining the display area of the first image and setting information regarding the predetermined character and/or symbol to be included in the first image and the letter styles, the image providing unit 120 disposes at least one character and/or symbol displayed with a predetermined letter style in the display area set by the user to generate the first image which is a 2D image as illustrated in FIG. 6. In this case, the set display area may thereafter correspond to the display area on the target surface such as the road surface, a wall, and the like onto which the generated long-range discernible image is to be actually displayed by printing, attachment, and the like. Meanwhile, according to the embodiment, the first image may be the 2D image prestored in a memory (not illustrated).

Continuously, in step S420, the image converting unit 140 reflects the predetermined point of view information to generate the second image in which the ratio of at least one area of the first image is changed. That is, the image converting unit 140 generates the second image by changing the ratio of at least one area of the first image according to the inverse perspective described with reference to FIG. 2 based on the predetermined point of view information. Herein, the point of view information as information for defining a 3D point (that is, a reference point of view) where the center of the view of the virtual viewer for the first image is positioned may include information on at least one of the direction of view, the angle of view, and the reference distance for the first image. Further, herein, the direction of view and the angle of view for the first image may be defined as the progress direction of a virtual extension line connecting the center m of the first image from the reference point of view and an angle between the extension line and the first image, respectively. In this case, the direction of view may be selected according to the user input as one of a direction (E direction) to view the center m of the first image at a lower external reference point of view of the first image, a direction (F direction) to view the center m of the first image at an upper external reference point of view, a direction (G direction) to view the center m of the first image at a left external reference point of view, and a direction (I direction) to view the center m of the first image at a right external reference point of view so that the extension line is vertical to a horizontal axis u or a vertical axis v passing through the center m of the first image as illustrated in FIG. 6. Further, the reference distance may be defined as a horizontal distance up to the reference point of view from the center of the first image. At least one of the direction of view, the angle of view, and the reference distance may be set according to the user input through the user input unit 110.

Referring to FIG. 5, step S420 may be constituted by a step (S422) of converting the first image into the 3D image and a step (S424) of generating the second image by rotating the first image at a predetermined rotational angle toward the direction of view and extracting the plane image.

First, in step S422, the image converting unit 140 may convert the first image into the 3D image. The 2D plan image may be converted into the 3D image by various methods applicable in the art. As one example, the image converting unit 140 may convert the first image into the 3D image by a method that substitutes the first image in an xy plane defined by coordinate values of an x axis and a y axis and sets the coordinate value of a z axis as the same value (for example, 0), in a 3D coordinate space defined as three axes vertical to each other, that is, the x axis, the y axis, and the z axis.

In step S424, the image converting unit 140 reflects the point of view information, rotates the first image converted into the 3D image at a predetermined rotational angle toward the direction of view around a predetermined rotary axis, and thereafter, extracts the plane image acquired by viewing the first image at the opposite side to the set direction of view to generate the second image. In this case, the rotary axis may be preferably one of the horizontal axis u and the vertical axis v vertical to the set direction of view and on the same plane as the first image passing through the center of the first image. In detail, the rotary axis is determined as the horizontal axis u when the direction of view is the E or F direction and as the vertical axis v when the direction of view is the G or I direction. Further, the rotational angle of the first image may be determined depending on the set angle of view. When the set angle of view is φ, the rotational angle may be an angle greater than 90°-2φ and smaller than 90° and preferably an angle of 90°−φ.

In step S424, the image converting unit 140 first projects the rotated first image onto the plane including the first image before rotation to extract a predetermined plane image acquired by viewing the first image at the opposite side to the set direction of view. That is, for example, referring to FIG. 7, when the set direction of view is the E direction, the image converting unit 140 may extract the plane image by rotating the first image in the direction of view at 90°—an angle of view φ by using the horizontal axis u as the rotary axis and projecting the rotated first image onto the plane (for example, the xy plane) including the first image before rotation. In this case, the extracted plane image becomes the same image as the image projected to the view of the viewer when the first image is viewed at the same angle of view φ in the F direction symmetric to the E direction which is the direction of view.

Figure 7:
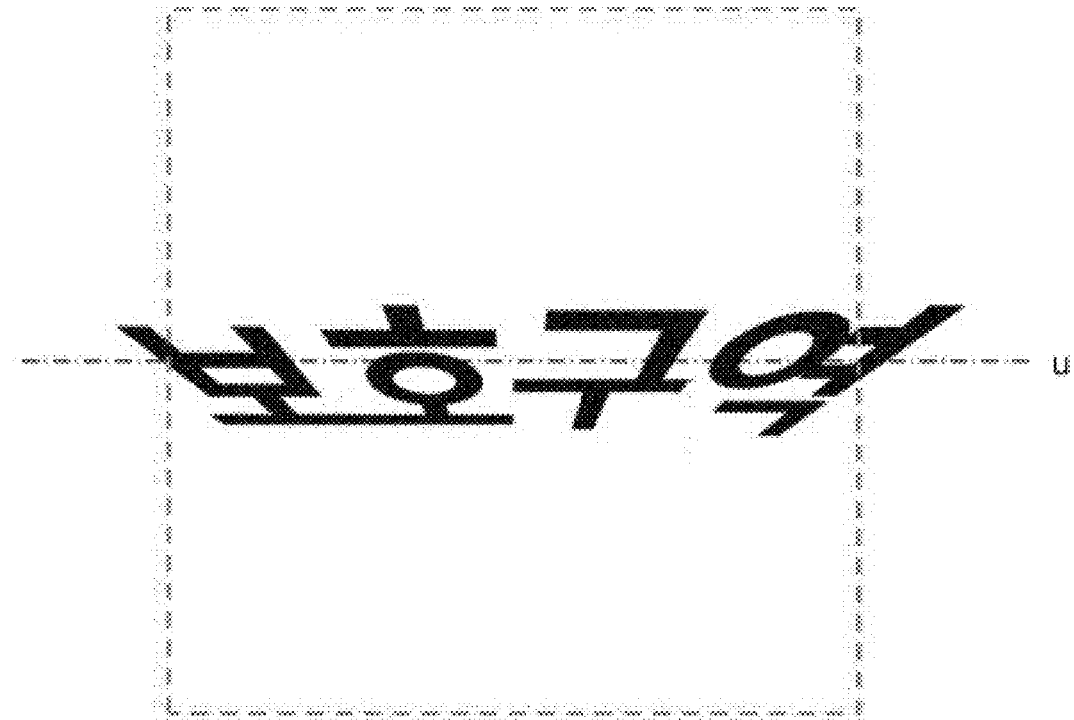
Figure 8:
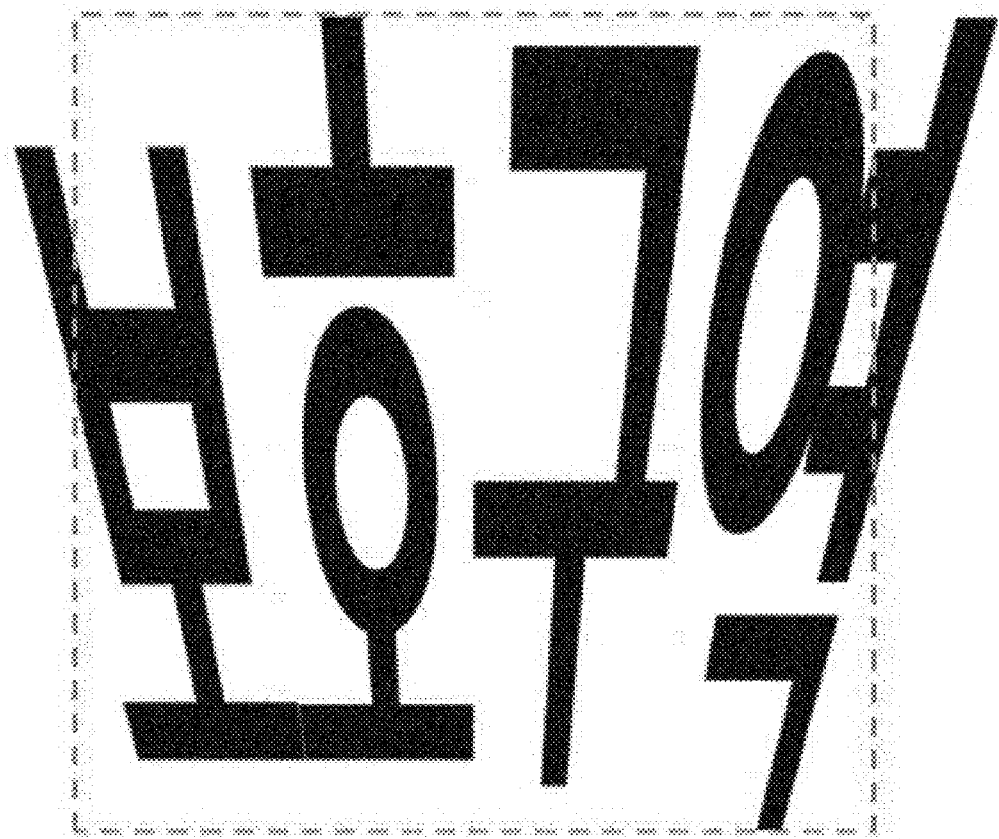

Next, the image converting unit 140 magnifies the extracted plane image in a predetermined direction as many as a predetermined multiple and modifies one of the height and the width of the extracted plane image to correspond to the first image to generate the second image to which the inverse perspective is applied. In this case, the direction to magnify the extracted plane image may be determined according to the set direction of view. That is, when the direction of view is the E or F direction, the plane image extracted in a vertical direction (alternatively, height direction) is magnified and when the direction of view is the G or I direction, the plane image extracted in a horizontal direction (alternatively, width direction) is magnified. Referring to FIG. 8, the plane image illustrated in FIG. 7 is magnified in the vertical direction (alternatively, height direction) similarly to the height of the first image to verify the generated second image. Since the second image illustrated in FIG. 8 is generated on the assumption that the direction of view is the E direction, the second image has a form in which the width and the length of the character increase from the bottom to the top of the second image according to the inverse perspective.

Meanwhile, in respect with step S424, it is described that the rotation of the first image, the extraction of the plane image from the rotated first image, and the magnification of the extracted plane image are sequentially performed, but the present invention is not limited thereto and according to the embodiment, the processes may be implemented to be performed at one time by a predetermined application program.

In step S430, the reference point extracting unit 130 may extract the coordinate of the first reference point (r1-r7) of the first image and the coordinate of the second reference point (r1'-r7') of the second image corresponding to the first reference point (r1-r7). Herein, the first reference point (r1-r7) means a point which becomes a reference for partitioning the first image into a plurality of reference areas and a determination criterion of the first reference point (r1-r7) may be diversified according to the embodiment to which the present invention is applied. That is, in FIG. 9, it is illustrated that the first reference point (r1-r7) is determined based on one character, but this is exemplary and according to the embodiment, the first reference point (r1-r7) may be configured to be determined based on one or more characters and/or symbols included in the first image.

Figure 9:
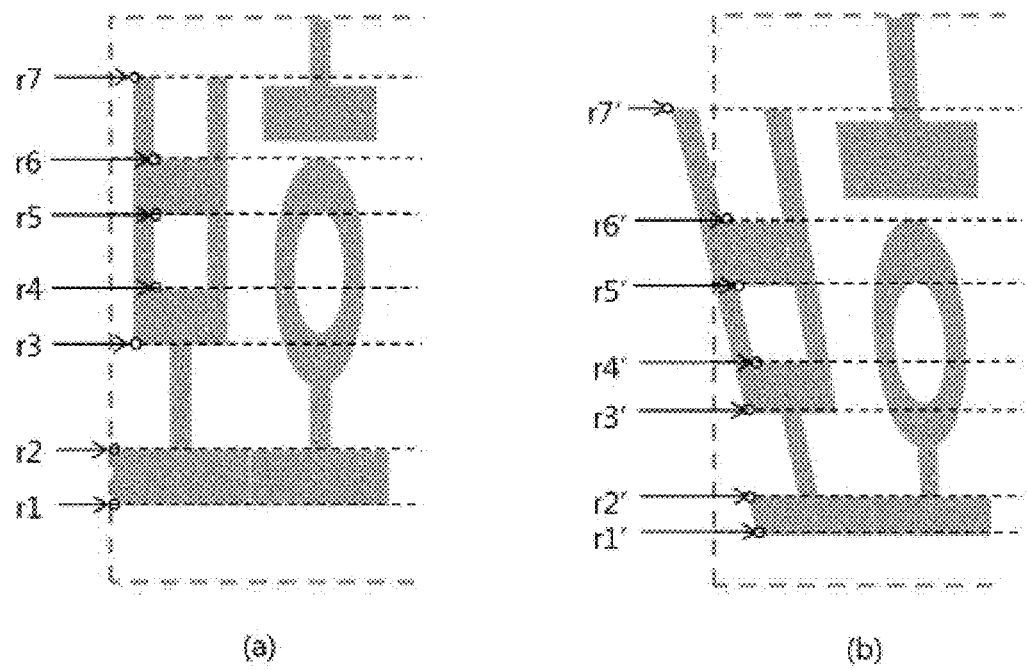

When the first reference point (r1-r7) is determined, the first image may be partitioned into the plurality of reference areas by the first reference point (r1-r7) as illustrated in FIG. 9. In this case, a partition direction of the plurality of areas by the first reference point (r1-r7) may be determined according to the set direction of view. That is, when the direction of view is the E or F direction, the reference area is horizontally partitioned based on the first reference point (r1-r7) and when the direction of view is the G or I direction, the reference area is vertically partitioned based on the first reference point (r1-r7).

Thereafter, the image converting unit 140 compares the coordinates of the first reference point (r1-r7) and the coordinates of the second reference point (r1'-r7') with each other and magnifies or reduces the reference area to transform the first image.

The positions and the number of the first reference points (r1-r7) and the second reference points (r1'-r7') illustrated in FIG. 9 are exemplary and various configurations may be applied according to the embodiment to which the present invention is applied.

Figure 10:
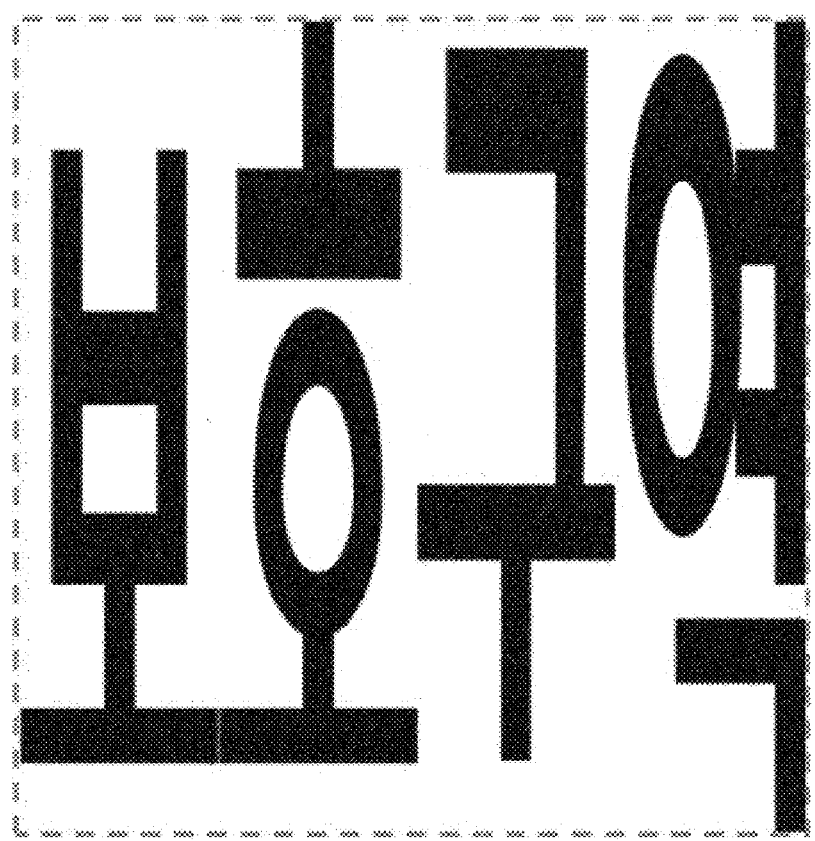

In step S440, the image converting unit 140 compares the coordinates of the first reference point (r1-r7) and the coordinates of the second reference points (r1'-r7') with each other to convert the first image into the long-range discernible image. In detail, the image converting unit 140 compares at least one value of the coordinates of the first reference point (r1-r7) and at least one of the coordinates of the second reference points (r1'-r7') corresponding to the first reference point (r1-r7) with each other and magnifies or reduces at least a part of the reference area partitioned by the first reference point (r1-r7) to convert the first image. For example, on the assumption that the direction of view of the E direction is applied, when it is assumed that the coordinates of r4 and r5 which are the first reference points of the first image are (x4, y4) and (x5, y5), respectively and the coordinates of r4' and r5' which are the second reference points corresponding to the first reference points are (x4', y4') and (x5', y5'), respectively, the reference area defined by the first reference points r4 and r5 may be magnified or reduced in the vertical direction so that the height of the reference area defined by the first reference points r4 and r5 becomes from y5-y4 to y5'-y4' and such a process is performed with respect to each of the reference area partitioned by the first reference point (r1-r7) to generate the long-range discernible image of FIG. 10, which is acquired by correcting the original first image in the vertical direction. Referring to FIG. 10, it can be seen that the first image of FIG. 6, which is the original image in the long-range discernible image is transformed in such a manner that the length of the first image increases toward the vertical direction.

Figure 11:
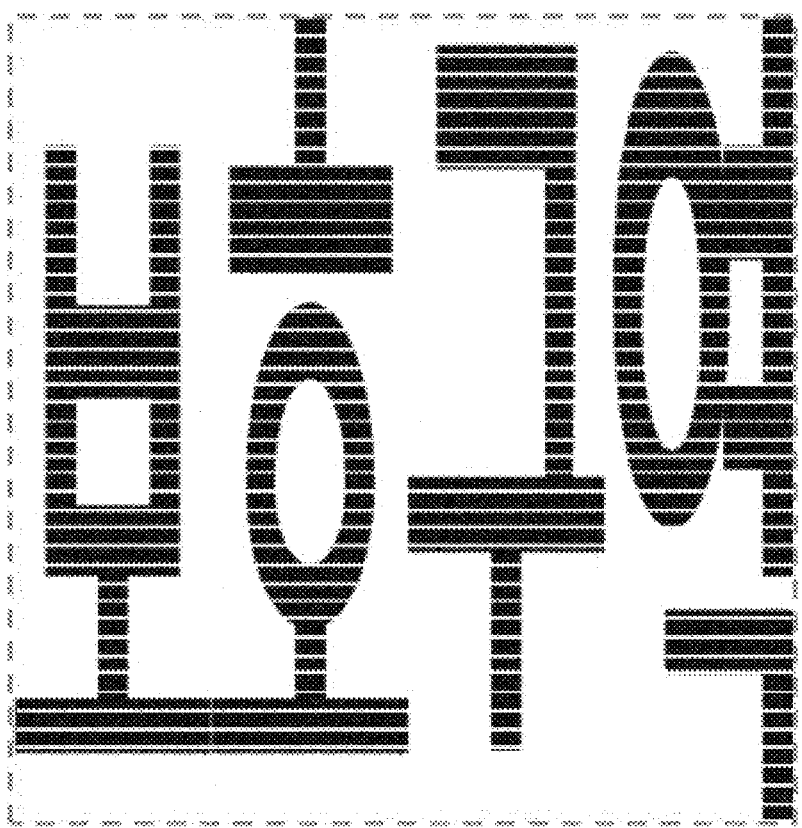

Meanwhile, although not illustrated in FIG. 4, a method (400) of operating the long-range discernible image generating apparatus 100 according to the embodiment of the present invention may further include a step of synthesizing layers including line patterns in a predetermined direction with the first image converted according to step S440. That is, in the step, the image converting unit 140 overlaps and synthesizes layers including stripe patterns in a predetermined direction, which are repeatedly formed in the first image converted according to step S440 with a predetermined thickness and at a predetermined interval to allow the line patterns in the predetermined direction in the long-range discernible image to be expressed with a predetermined thickness and at a predetermined interval, as illustrated in FIG. 11. In this case, the directions of the line patterns may be determined differently according to the direction of view. In detail, layers including horizontal line patterns may be implemented to be synthesized when the direction of view is the E or F direction and layers including vertical line patterns may be implemented to be synthesized when the direction of view is the G or I direction. Through synthesizing the line patterns, paint, and the like may be saved in printing on the actual target surface and an effect to make the long-range discernible image appear more visually merged with an environment may be acquired. As one example, the ratio of the thickness of the line pattern and the interval between the line patterns is preferably 4:1, but the ratio may be variously changed for different situations.

Figure 12:
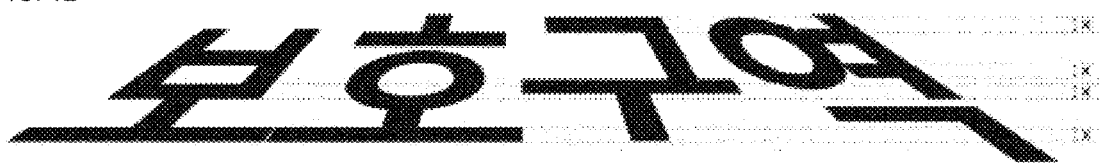

In FIG. 12, the image projected to the view of the viewer is exemplarily illustrated when the long-range discernible image of FIG. 10 is viewed at a predetermined set angle of view in the direction of view of the E direction. Referring to FIG. 12, it can be seen that through the long-range discernible image generated by the long-range discernible image generating apparatus 100 according to the embodiment of the present invention, the legibility for the image projected to the viewer in a specific direction of view and a specific angle of view is significantly improved.

Meanwhile, various embodiments disclosed in the present specification may be implemented by hardware, middleware, microcode, software, and/or a combination thereof. For example, various embodiments various embodiments may be implemented in one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform functions presented herein, or a combination thereof.

Further, for example, various embodiments may be recorded or encoded in a computer-readable medium including commands. The commands recorded or encoded in the computer-readable medium may allow the programmable processor or other processor to perform a method, for example, when the commands are executed. The computer-readable medium includes all communication media including a computer storage medium and a predetermined medium that facilitates transfer of a computer program from one place to the other place. A storage medium may be a predetermined available medium which may be accessed by a computer. For example, the computer-readable medium may include a RAM, a ROM, an EEPROM, a CD-ROM, or other optical disk storage medium, a magnetic disk storage medium or other magnetic storage device, or predetermined other media which may be used to transport or storage a desired program code in the form of the commands which may be accessed by the computer or data structures.

The hardware, software, firmware, and the like may be implemented in the same device or individual devices so as to support various operations and functions disclosed in the present specification. Additionally, in the present invention, constituent elements, units, modules, components, and the like disclosed as "unit" may be individually implemented as logic devices which are operated together or individually, but may be mutually operated. Description of different features of the modules, the units, and the like is intended to emphasize different functional embodiments and does not requisitely mean that the embodiments need to be implemented by individual hardware or software components. On the contrary, functions associated with one or more modules or units may be performed by individual hardware or software components or integrated in common or individual hardware or software components.

Operations are illustrated in drawings in a specific order, but it should not appreciated that the operations need to be performed in a specific order or a sequential order which is illustrated or all illustrated operations need to be performed in order to achieve a desired result. In a predetermined environment, multi-tasking or parallel tasking may be advantageous. Moreover, in the aforementioned embodiments, it should not be appreciated that various components need to be distinguished in all embodiments and it should be appreciated that the disclosed constituent elements may be generally together integrated in a single software product or packaged to multiple software products.

Optimal embodiments are disclosed in the drawings and the specification. Herein, specific terms are used, but this is just used for the purpose of describing the present invention, but not used for limiting a meaning or restricting the scope of the present invention disclosed in the claims. Therefore, it will be appreciated by those skilled in the art that various modifications and other embodiments equivalent thereto can be made therefrom. Accordingly, the true technical scope of the present invention should be defined by the technical spirit of the appended claims.

The invention claimed is:

1. A method for generating a long-range discernible image, the method comprising:
   providing a first image including at least one character;
   generating a second image which has proportions of the first image altered by reflecting predetermined point of view information for the first image, wherein the predetermined point of view information includes information on at least one of a direction of view and an angle of view for the first image;
   extracting at least two first reference points from the first image, the at least two first reference points having a first reference area therebetween, extracting at least two second reference points from the second image, each reference point of the at least two second reference points extract from the second image corresponding to each reference point of the at least two first reference points extracted from the first image, respectively; and
   converting the first image to the long-range discernible image by modifying a height of the first reference area based on a comparison of the at least two first reference points extracted from the first image and the at least two second reference points extracted from the second image.

2. The method of claim 1, wherein the generating of the second image includes
   converting the first image into a 3D image, and
   generating the second image by
      rotating the 3D-converted first image at a predetermined rotational angle toward the direction of view around a predetermined rotary axis reflecting the predetermined point of view information, and
      extracting a plane image of the rotated 3D-converted first image.

3. The method of claim 2, wherein the rotary axis is one of a horizontal axis or a vertical axis, each of which is on the same plane as the 3D-converted first image, and wherein the rotational angle is determined by the angle of view.

4. The method of claim 3, wherein when the angle of view is φ, the rotational angle is an angle greater than 90°−φ and smaller than 90°.

5. The method of claim 4, wherein the rotational angle is 90°−φ.

6. The method of claim 2 further comprising elongating the plane image.

7. The method of claim 1, further comprising:
including line patterns in the converted first image, in a predetermined direction, at a predetermined interval.

8. A non-transitory computer readable storage medium having a program recorded thereon configured to perform the method of claim 1.

9. A long-range discernible image generating apparatus comprising:
a processor;
a non-transitory computer readable storage medium comprising processor-executable commands, which when executed by the processor, implements a method comprising:
providing a first image including at least one character,
generating a second image which has proportions of the first image altered by reflecting predetermined point of view information for the first image, wherein the predetermined point of view information includes information on at least one of a direction of view and an angle of view for the first image,
extracting at least two first reference points from the first image, the at least two first reference points having a first reference area therebetween, extracting at least two second reference points from the second image, each reference point of the at least two second reference points extracted from the second image corresponding to each reference point of the at least two first reference points extracted from the first image, respectively; and
converting the first image to the long-range discernible image by modifying a height of the first reference area based on a comparison of the at least two first reference points extracted from the first image and the at least two second reference points extracted from the second image.

10. The long-range discernible image generating apparatus of claim 9, wherein the generating of the second image includes:
converting the first image into a 3D image, and
generating the second image by
rotating the 3D-converted first image at a predetermined rotational angle toward the direction of view around a predetermined rotary axis reflecting the predetermined point of view information, and
extracting a plane image of the rotated 3D-converted first image.

11. The long-range discernible image generating apparatus of claim 10, wherein the rotary axis is one of a horizontal axis or a vertical axis, each of which is on the same plane as the 3D-converted first image, and wherein the rotational angle is determined by the angle of view.

12. The long-range discernible image generating apparatus of claim 11, wherein when the angle of view is φ, the rotational angle is an angle greater than 90°−2φ and smaller than 90°.

13. The long-range discernible image generating apparatus of claim 12, wherein the rotational angle is 90°−φ.

14. The long-range discernible image generating apparatus of claim 10 further comprising elongating the plane image.

15. The long-range discernible image generating apparatus of claim 9, wherein the method further comprises including line patterns in a predetermined direction, at a predetermined interval.

* * * * *